United States Patent [19]

Spanko

[11] Patent Number: 4,598,666
[45] Date of Patent: Jul. 8, 1986

[54] FELINE PROTECTIVE GARMENT

[75] Inventor: Jacob E. Spanko, 3-H Chatham Center Apts., Pittsburgh, Pa. 15219

[73] Assignee: Jacob E. Spanko, Pittsburgh, Pa.

[21] Appl. No.: 684,804

[22] Filed: Dec. 21, 1984

[51] Int. Cl.⁴ ............................ A01K 27/00; A01K 29/00
[52] U.S. Cl. .................................... 119/106; 119/143; 128/169
[58] Field of Search ............ 119/106, 143; 128/76 R, 128/77, 165, 169; 54/19 R, 19 B

[56] References Cited

U.S. PATENT DOCUMENTS

| | | | |
|---|---|---|---|
| 3,256,882 | 6/1966 | Huber | 128/169 X |
| 3,458,867 | 8/1969 | Moore et al. | 128/165 X |
| 3,568,670 | 3/1971 | Gaylord, Jr. | 128/169 X |
| 3,738,330 | 6/1973 | Alofsin | 119/143 |
| 3,965,589 | 6/1976 | McDermott | 40/21 C |
| 4,384,548 | 5/1983 | Cohn | 119/106 X |

Primary Examiner—Robert P. Swiatek
Attorney, Agent, or Firm—Reed Smith Shaw & McClay

[57] ABSTRACT

Neck garment for a female cat adapted to deter its impregnation by males while being worn having an integral band adapted to be wrapped around and span a feline neck without noticeably restricting its motility and further presenting a smooth texture sufficiently smooth to preclude a male cat upon attempting to initiate coupling from obtaining a normal grip on the upper neck of the female cat a first and second elongated band segment connected to extend in opposite directions from the lateral edges of the integral band adapted to permit the inner surface of one segment to be interruptably secured to the outer surface of the other segment.

3 Claims, 4 Drawing Figures

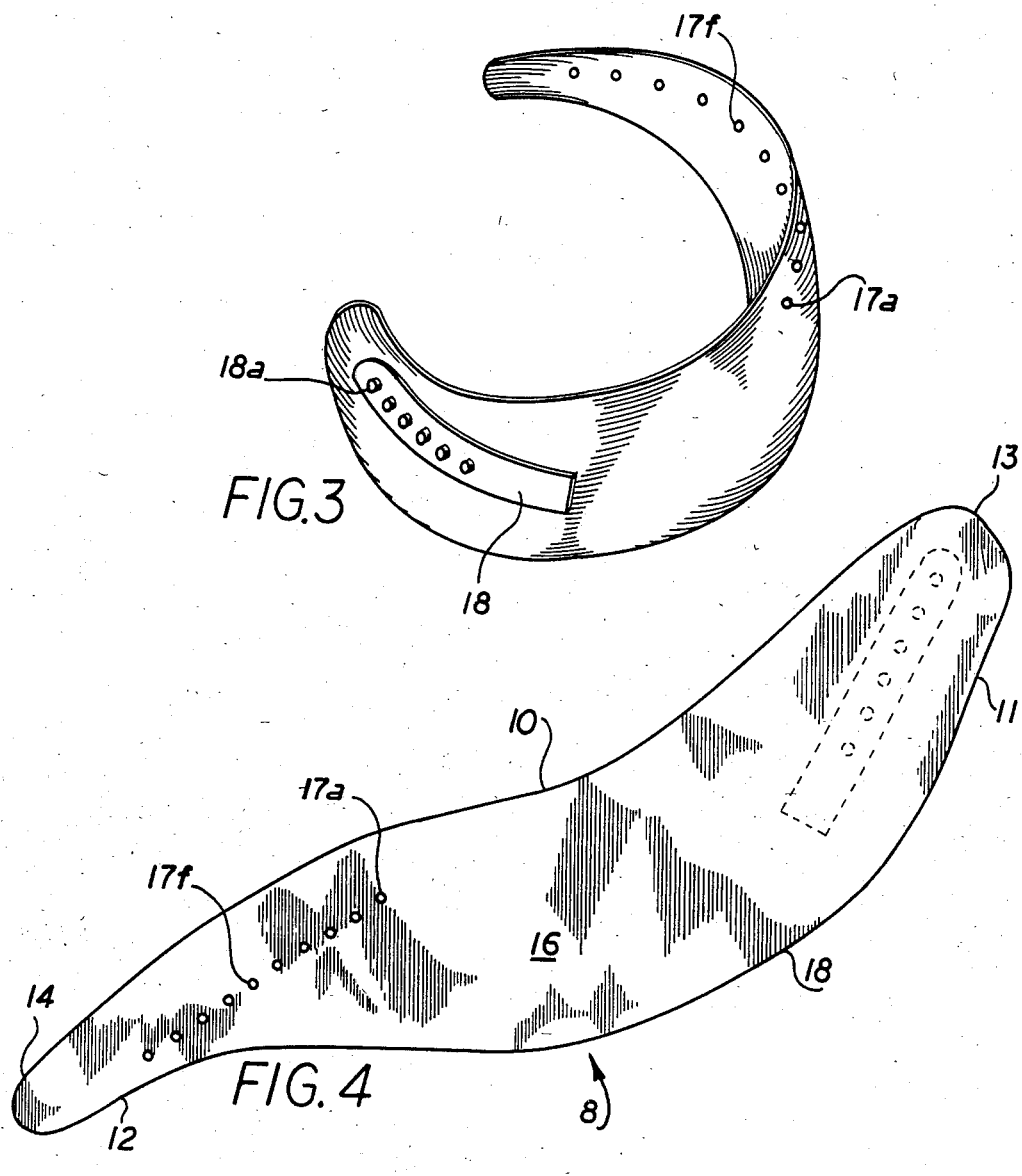

FELINE PROTECTIVE GARMENT

This invention relates to a collar to shield female cats from impregnation during periods which such impregnation is undesired by the pet owner. In another aspect it relates to a removable feline protective garment that can be sized to variations in animal size.

BACKGROUND OF THE INVENTION

It is well established that there are at least six physical steps for male cats to mate with female cats, whether they have been neutered or not. Short of medically altering the female, or isolating it from all contacts with other cats that are of the male species, there is no effective way to maintain potential fecundity until a suitable mate is chosen.

The mating ritual involves: the male gripping the neck of the female with its teeth; mounting the upper torso with its forelegs; straddling the lower torso with its hindlegs; rubbing the female neck area with its forepaws; making stepping movements while mounted; and then engaging in pelvic thrusts to effect copulation.

If the male cannot gain a secure grip on the scruff of the female's neck, he is unable to proceed with the latter steps and will soon become discouraged and quit that female.

It is the main object of this invention to provide a non-maiming method which precludes unwanted impregnation of fertile cats. It is another object to preserve the fertility of a female cat while permitting free association with others of its species. It is a further object to manage the mating of a cat without resorting to surgical steps or its physical isolation.

SUMMARY OF THE INVENTION

A neck garment for a female cat adapted to deter its impregnation by males while being worn and capable of being worn during all other normal feline activities, comprising:

an integral band adapted to be wrapped around and span a feline neck without noticably restricting its motility and further presenting a smooth texture sufficiently smooth to preclude a male cat upon attempting to initiate coupling from obtaining a normal grip on the upper neck of the female cat. A first and second elongated band segment connected to extend in opposite directions from the lateral edges of said integral band and being of length sufficient to partially overlap one another, and adapted to permit the inner surface of one segment to be interruptably secured to the outer surface of the other segment while in close proximity to the feline neck.

BRIEF DESCRIPTION OF THE DRAWINGS

FIG. 3 is another perspective view showing the profile of the flexible garment; and FIG. 4 is another plan view of the garment before placement as seen from the internal side that is hidden during wearing.

Figure 1:
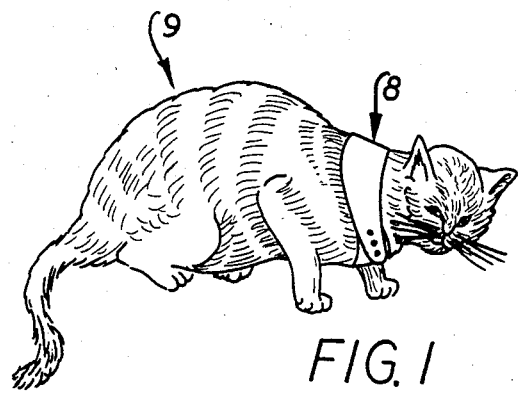
FIG. 1 is a perspective view of the novel protective garment on the cat to be shielded.
Figure 2:
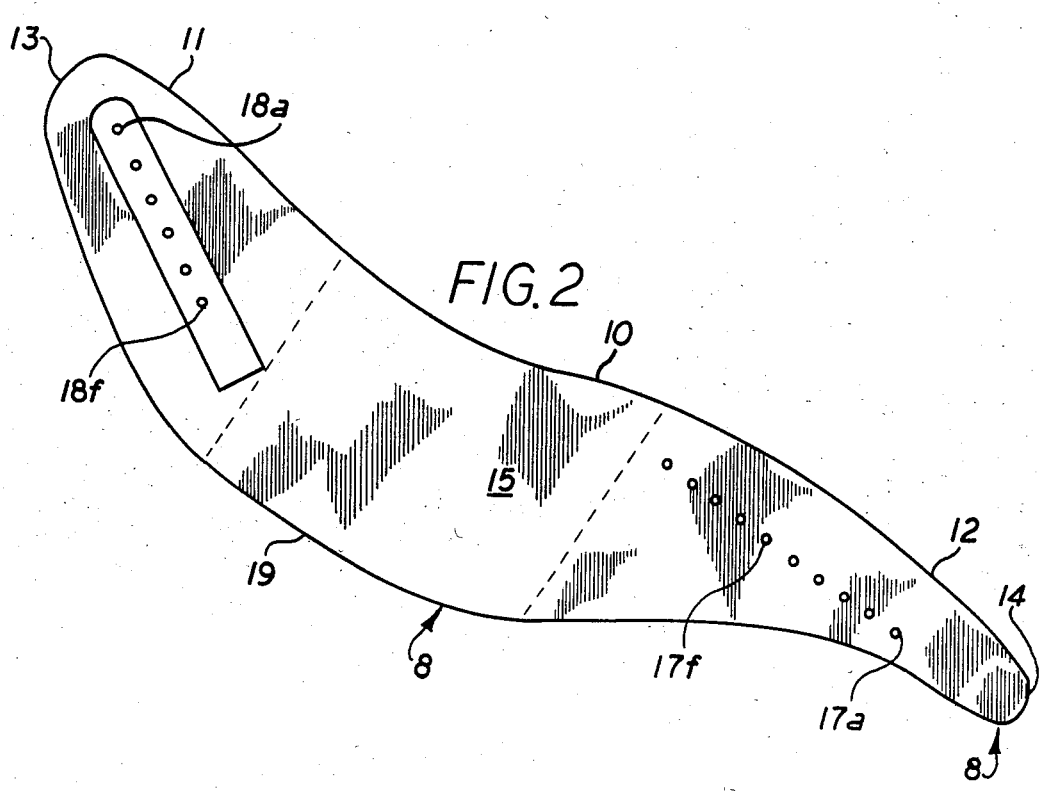
FIG. 2 is a plan view of the protective article as it would appear before placement as seen from its external side.

Referring now to the drawing, and FIG. 1 specifically:

A garment, generally 8, for a female cat 9 is adapted to deter its invasion (and possible impregnation) by males while being worn. The construction is such that it is capable of being worn during all normal feline activities.

The operative portion of the garment 8 comprises an integral neck band section 10 adapted to be wrapped around a feline neck, but without noticably restricting its motility.

When in place, it forms an adjustable-length neck loop that fits over the feline neck and attaches thereto. It should extend from the occipital bone over all cervical vertebrae up to the dorsal vertebrae.

First and second elongated band segments, 11 and 12, are connected to extend in opposite directions from the lateral edges of the integral band 10. They are of length sufficient so as to substantially overlap one another when in use. Each of said segments has a free end 13 and 14 and an outer surface 15 and an inner surface 16 (FIG. 4). These are adapted to permit the inner surface 16 of segment 12 to be interruptably secured to the outer surface 15 of segment 11, while the device is positioned in close proximity to the cat torso, as seen in FIG. 1.

In an alternate embodiment, a flexible sheeting 10 material (not shown) would be secured to the external surface 15 of the main fabric-like band presenting a smooth texture that must be sufficiently slippery to preclude a male cat upon coupling from first obtaining a secure grip with his teeth on the scruff of the neck of the female cat, as is invariably required to accomplish copulation.

One convenient means for providing for the attachment of segment 12 over segment 11 is the inclusion of a plurality of linearly arranged openings, such as 17a through 17f in segment 12, and a corresponding array of linearly arranged protruding buttons, such as 18a through 18f on the outer surface of segment 11. They will need, of course, to be aligned so that the buttons abut the openings for fastening when the shield is placed around the cat's scruff. Inclusion of this feature in fabrication of the shield is within the skill of the relevant art.

In FIG. 3, the functional conical frustrum configuration of the fabricated hollow collar is shown. In FIG. 1, it is further depicted how the assembled collar conforms to the normal cervical contour while in close proximity to the feline neck.

Alternatively, the garment has at least one strip of adhesive material, such as Velcro cloth, secured to each of the free ends 13 and 14 of the segments 11 and 12, respectively. It is comprised of mutually adhesive materials that lock when contacted. The first strip of Velcro material is secured to the inner face 16 of said first segment 12. The second strap of Velcro material is secured to the outer face 15 of the second segment 11. Thereby, the segments may be adjustably interconnected in partially overlapping fashion through such adhesive engagement of the first and second segments. This is done at a selected location therealong so as to jointly define with the main band a circumambient shield of a circumference suitable for the particular cat's size.

In a preferred embodiment, the external surface comprises a flexible sheet of an elastomeric material, bonded either by stitching or lamination to the underlying integral band 11. Fairly thick, but flexible, polyvinyl chloride or polyolefin sheeting will be a suitable material for this purpose. Further, the flexible elastomeric band 10 should be of a dimension and durability sufficient to permit its trimming along its posterior edge 19 to size the garment to the specific feline torso to be outfitted.

In another embodiment, the end 14 of one of the band segment 12 is further adapted to serve as a tongue portion mating with spaced eyelets of a standard adjustable belting assembly. The other of the band segments is provided with a conventional rigid buckle and fork, adapted to receive the tongue portion and interlock the fork with one of the spaced eyelets thereof (not shown).

A basic feature of this garment provides that the integral band bulges substantially along its posterior edge in the area where it overlies the feline neck while it tapers down inwardly as it extends toward the connecting band segments.

I claim:

1. Neck garment for a female cat adapted to deter its impregnation by males while being worn and capable of being worn during all other normal feline activities, comprising:

a. an integral band adapted to be wrapped around and span a feline neck without noticeably restricting its mobility and further presenting a texture sufficiently smooth to preclude a male cat from coupling by obtaining a normal grip on the upper neck of the female cat by the teeth as is normally required to accomplish copulation, said band having an external surface comprising a flexible sheet of an elastomeric material bonded to an underlying fabric-like integral band, said sheet being of a dimension and durability sufficient to permit its trimming along its posterior edge to size the garment to the specific feline neck to be outfitted; and b. a first and second elongated band segment connected to extent in opposite directions from the lateral edges of said integral band and being of length sufficient to partially overlap one another, each of said segments having a free end and a substantially flat inner and outer surface, and an attachment means adapted to permit the inner surface of one segment to be interruptably secured to the outer surface of the other segment, whereby the assembled garment forms a hollow collar shaped like a conical frustrum that conforms to the cervical contour while in close proximity to the feline neck.

2. The garment of claim 1 wherein one segment is provided with a plurality of linearly arranged openings and the other segment on its outer surface is provided with a plurality of linearly arranged buttons, with the openings and buttons being aligned to permit fastening when the shield is placed around the feline neck.

3. The garment of claim 1 wherein the integral band bulges substantially along its posterior edge in the area where it overlies the feline neck and tapers down inwardly as it extends toward the connecting band segments.

* * * * *

UNITED STATES PATENT AND TRADEMARK OFFICE
CERTIFICATE OF CORRECTION

PATENT NO. : 4,598,666
DATED : July 8, 1986
INVENTOR(S) : Jacob E. Spanko

It is certified that error appears in the above-identified patent and that said Letters Patent are hereby corrected as shown below:

Column 2, line 28, after "cat" insert -- intent --.

Signed and Sealed this

Fourteenth Day of October, 1986

[SEAL]

Attest:

DONALD J. QUIGG

*Attesting Officer*  *Commissioner of Patents and Trademarks*